3,136,830
METHOD OF PREPARING ELASTIC
POLYURETHANE
Harald Oertel and Erwin Müller, Leverkusen, Germany, assignors to Farbenfabriken Bayer Aktiengesellschaft, Leverkusen, Germany, a corporation of Germany
No Drawing. Filed Apr. 5, 1961, Ser. No. 100,822
Claims priority, application Germany Apr. 9, 1960
5 Claims. (Cl. 264—184)

This invention relates to elastic fibers and a method of preparing the same. More particularly, it relates to the preparation of elastic polyurethane fibers having improved physical properties.

It has been heretofore known to produce elastic polyurethane fibers by converting polyesters or polyethers having relatively high molecular weights into an initial adduct containing free —NCO groups by reacting with an excess of organic polyisocyanates and then reacting this adduct with polyhydric amines of low molecular weight while simultaneously shaping the reaction mass into a fiber by passing through a spinning nozzle. The filament finally reaches the maximum strength after being thoroughly washed with water and dried. These fibers of the prior art are subject to disadvantages of a low resistance to hydrolysis and also a low resistance to aging and ultraviolet rays.

It is, therefore, an object of this invention to provide improved polyurethane fibers. It is another object of this invention to provide an improved method of making polyurethane fibers. It is still another object of this invention to provide polyurethane fibers and a method of making the same, which fibers are not subject to the disadvantages of the fibers known in the art. It is a further object of this invention to provide a method of making polyurethane fibers which are resistant to both basic and acid environments.

The foregoing objects and others which will become more apparent from the following description are accomplished in accordance with the invention, generally speaking, by providing a method for making elastomeric polyurethane fibers wherein a linear polyacetal having at least two hydroxyl groups is reacted with an excess of organic polyisocyanate and the resulting adduct is spun as a liquid into an organic polyamine. It is essential that the polyacetal have a molecular weight of at least about 500 to about 5000. Even better results are obtained if the molecular weight of the polyacetal is between about 800 and about 2500. Moreover, the simultaneous reaction of a polyacetal and another compound having reactive hydrogen with the polyisocyanate results in the formation of an adduct having even better properties for spinning into a filament. The compound having reactive hydrogen used with the polyacetal in making the adduct must have a molecular weight of less than 400 and can be hydrozines, a polyhydric alcohol, water, polyamine or amino alcohol.

The polyacetal utilized in the process of this invention may be any polyacetal containing at least two hydroxyl groups and having a molecular weight of from about 500 to about 5000 and more preferably from about 800 to about 2500. The polyacetals are prepared by reacting polyhydric alcohols with aliphatic aldehydes. These polyacetals contain as the chain linking member, the grouping —O—CHR—O— in which R represents hydrogen, an alkyl, or an alkenyl such as, for example, methyl, ethyl, propyl, butyl, amyl, ethenyl, propenyl, butenyl and the like. Any suitable polyhydric alcohol may be used in the preparation of polyacetals such as, for example 1,4-butanediol, 1,6-hexanediol, 1,4-butane-β-dihydroxy ethyl ether, dihydroxy ethyl ether, diethylene glycol, triethylene glycol and the like. Further, proportions of the alcohol may be alcohols of high functionality such as, for example, trimethylol propane, glycerine and the like.

Any suitable aldehyde may be used in the preparation of the polyacetals such as, for example, formaldehyde, paraformaldehyde, acetaldehyde, crotonaldehyde, chloral and the like. It is preferred, however, that formaldehyde and paraformaldehyde be used. Any of the polyacetals having a molecular weight of from 500 to 5000 set forth in U.S. Patent 2,961,429 may be used in the process of this invention to prepare polyurethane fibers. The polyacetal should have a molecular weight between those limits set forth above and a melting point preferably lower than 60° C. The polyacetal utilized in this invention also includes reaction products of polyacetals with a deficiency of polyisocyanates, thus resulting in an hydroxyl terminated intermediate within the desired molecular weight range.

Any suitable organic polyisocyanate may be used in reaction with the hydroxyl polyesters to form fibers in accordance with this invention such as, for example, 2,4- and 2,6-toluylene diisocyanates, 4,4'-diphenylmethane diisocyanate, 1,4-phenylene diisocyanate, 4,4'-diphenyl dimethylmethane diisocyanate, hexamethylene diisocyanate, 1,4-cyclohexane diisocyanate, furfurylidene diisocyanate and the like. It is preferred, however, to use 4,4'-diphenylmethane diisocyanate as the organic polyisocyanate.

In the production of the initial adduct which is subsequently to be spun into a polyamine bath, the polyacetals are reacted with an excess of polyisocyanates so the adduct contains terminal —NCO groups. In order to produce the adduct which will consistently produce a filament having optimum physical properties, the —NCO to —OH ratio should be from about 1.9:1 to 3.5:1. The reaction is carried out at a temperature preferably between about 70° C. and 130° C. This reaction may be conducted using only the two reactants, however, it is preferred to carry out this reaction in a solvent such as, for example, dioxane, tetrahydrofuran, dimethyl formamide, dimethyl acetamide, methyl ethyl ketone, glycol monomethyl ether acetate, methylene chloride, chloroform and the like.

Gentle preparation of the initial adduct can be successfully carried out by reacting the polyacetal with a solution of the diisocyanate in a large quantity of methylene chloride or chloroform, the solvent being distilled while raising the temperature to about 100° C.

According to a preferred embodiment of the invention, water, hydrazines or a low molecular weight organic compound containing groups reactive with isocyanate groups as determined by the Zerewitinoff method is concurrently employed with the polyacetal in the reaction with the organic diisocyanates to produce the —NCO terminated intermediate. These low molecular weight compounds containing active hydrogen atoms must have a molecular weight less than about 400. Of course, hydrazines include hydrazine per se as well as substituted hydrazines such as, for example, methyl hydrazine, dimethyl hydrazine and the like. Any suitable organic compound having active hydrogen atoms reactive with —NCO groups and a molecular weight less than about 400 may be used concurrently with the polyacetal such as, for example, polyhydric alcohols, polyamines and aminoalcohols including ethylene glycol, propylene glycol, 1,4-butanediol, 1,6-hexanediol, trimethylol ethane, trimethylol propane; hydroxyalkylated glycols, phenols or amines such as 1,4-bishydroxyethoxy butane, bis-hydroxy ethyl hydroquinone, N,N'-bishydroxy ethyl piperazine; alcohols containing urea or urethane groups such as, the reaction product of one mol of hexamethylene diisocyanate and two mols of amino ethanol, one mol of butane-bis-chlorocarbonate acid esters, and two mols of amino propanol; ethylene diamine, diethylene triamine, N-methyl dipropylene triamine, piperazine and its ethyl derivatives, bis-(γ-aminopropyl)-piperazine, di-(γ-amino-propoxy)-butane, 4,4'-diamino-diphenyl-methane, amino propanol and amino ethanol. Hydrazine hydrate and water are also suitable for this purpose.

In this embodiment when other compounds are used concurrently with the polyacetals in reaction with the polyisocyanates, the amount of polyisocyanate is still used in excess of the total quantity of active hydrogen atoms present. The hydroxyl containing compounds can be used in quantities of from about 0.1 percent to about 60 percent of the —NCO Groups which remain unused after reaction with the polyacetal. The polyacetal and the modifying component of low molecular weight can be mixed before-hand or can be jointly dissolved in a solvent or it is even possible first of all to react the polyacetal with the polyisocyanate and then add the modifying component of low molecular weight. When hydrazine hydrate or diamines are used as modifying components, it is preferable on account of the high reactivity thereof for a dilute solution of hydrazine or amine to be incorporated into the reaction product of the polyacetal with the polyisocyanate, which if necessary is diluted with solvents and for provision to be made for the mixing to be as quick and as intensive as possible. Water is preferably added in the form of solvents of definte water content to the reaction product containing free —NCO groups. It is advantageous to add amino alcohols, since in this case, the danger of premature cross-linking is substantially smaller, because first of all the amino groups react, while the hydroxyl groups react more slowly.

Due to this modifying reaction and due to the concurrent use of solvents, it is readily possible not only to vary the viscosity of the initial adduct in the manner desired for the subsequent spinning process, but it is also possible to adjust those conditions which are most favorable for the best elastic properties of the fibers.

The —NCO terminated intermediate prepared in the manner set forth above in the form of their relatively viscous melts suitable for drawing filaments or in solution of an inert solvent are reacted while being shaped by a spinnerette with polyhydric amines of low molecular weight which comprises at least two hydrogen atoms capable of reaction with isocyanates, the hydrogen atoms being located on various nitrogen atoms.

These spinning baths can contain the amines in liquid form or even in aqueous or organic solution. Mentioned as solvents are methanol, ethanol, dioxane, dimethyl formamide or hydrocarbons. The solution can be of any desired concentration, but nevertheless it is preferably not lower than 10%. Mentioned as polyhydric amines of low molecular weight are ethylene diamine, tetramethylene diamine, hexamethylene diamine, diethylene triamine, N-methyl dipropylene triamine, N,N'-bis-(γ-aminopropyl)-piperazine, 1,4-bis-(aminomethyl)-cyclohexane or 4,4'-diamino-dicyclohexyl methane and preferably 1,4-hexahydrophenylene diamine.

Catalysts which accelerate the —NCO reactions such as, for example, tertiary amines including trimethylamine or triethylene diamine, dimethyl aniline, hexahydrodimethyl aniline, alkyl morpholines, dialkyl piperazines and the like can be added to the spinning baths.

Pigments, fillers, heat stabilizers, light stabilizers or oxidation stabilizers can be added to the spinnable initial adduct before being spun into the spinning baths.

After leaving the hardening bath, the filament can be subjected to a thorough washing process with water at a temperature of about 40° C. to about 70° C. and then be wound at speeds of about 5–30 m./min. onto a spool. For better handling of the filaments, it has proved advantageous in many cases for the filament to be subjected to an increased tension during the washing process and during the winding onto the spool. For this purpose, the filament after leaving the hardening bath, can be drawn off with the use of an intermediate roller system, the speed of which is 5 to 15 m./min., the filament being wound directly at a speed of 10 to 30 m./min. after passing through the water bath, or being wound at a somewhat reduced speed after a certain relaxation.

Because the amine cross-linking takes place instantaneously, the filaments have a surface quality which shows little tendency to sticking, whereby also the individual filaments of a filament spun in multifilar form can be easily separated from one another.

The highly elastic fibers obtained by the present process have a substantially higher resistance to hydrolysis as compared with the fibers with a polyester base obtainable by known processes and show a better resistance to aging and ultraviolet rays than the fibers obtainable with a polyether base. It was surprisingly found that fibers produced with the use of polyacetals show a considerable resistivity, not only in basic media, but also in acid media.

The polyacetal filaments can be used for a large number of purposes because of their good properties, such as high elastic elongation, relatively high initial moduli, high restoring power and low permanent elongation.

Since they can also be made with a substantially smaller filament thickness than was hitherto possible with rubber filaments, they can moreover be dyed very satisfactorily and are proved to be resistant to oil and benzine, so these filaments are especially suitable for the production of elastic textiles useful in the manufacture of bathing costumes, elastic ski hose, rubber stockings, for use in the corsetry industry and the production of narrow textiles, for example, sock welts, knitted strips and belts.

The invention is further illustrated by the following examples in which parts are by weight unless otherwise specified.

*Example 1*

About 300 parts of a polyacetal prepared by reacting 10 mols of hexane-1,6-diol and 11 mols of formaldehyde to an hydroxyl number of about 39 are reacted together with about 2.77 parts of trimethylolethane and about 3.12 parts of butane-1,4-diol in the presence of 100 ml. of absolute dioxane with about 69.5 parts of 4,4'-diphenyl methane diisocyanate at about 80° C. After about 2½ hours, a viscous solution is obtained having an —NCO number of about 1.67 percent.

The solution described is spun by means of a gear wheel pump from an 8-aperture spinneret having a bore diameter of 0.20 mm. into a bath at a temperature of about 20° C. containing practically anhydrous ethylene diamine. After a precipitation or reaction path of about 0.6 mm., the filament is led over a guide roller through a water bath at a temperature of from about 40 to about 60° C. to rinse off the excess ethylene diamine which adheres to the filament, and then wound at 10.6 m./min. The highly elastic filament, with a denier of 330, has a strength of 0.20 g./den., and a breaking elongation of 400 percent. The resistance of the filament to acid and alkali is extremely high; it does not lose any strength by being boiled for 1 hour in 20 g./l. formic acid or by boiling for 4 hours in 50 g./l. caustic soda solution.

*Example 2*

The spinning solution described in Example 1 is spun by means of a gear wheel pump from an 8-aperture spinneret into a bath containing about 500 parts of 1,4-hexahydrophenylene diamine in about 2000 ml. of methanol. The filament is kept for about 1 hour in warm water to remove the excess adhering diamine. A filament of about 500 den. has a breaking strength of 0.5 g./den. and a breaking elongation of 520 percent. The permanent elongation of the filament (10 minutes elongation by 100 percent and measured half a minute after being relaxed) is 2.7 percent.

The filament shows a fiber lubrication point of about 224° C.

Example 3

About 400 parts of the polyacetal described in Example 1 are heated together with about 5.55 parts of trimethylol ethane in about 120 ml. of absolute dioxane and with about 101.0 parts of diphenyl methane-4,4'-diisocyanate for about 3 hours at 80° C. The resulting viscous solution has an —NCO number of 2.20. In the manner described in Example 1, this solution is spun into a bath containing 70 percent aqueous ethylene diamine. The filament consisting of 8 separate filaments is wound at 12 m./min. onto a spool and thereafter is freed from adhering ethylene diamine by rinsing in running water.

It is of course to be understood that any of the polyacetals prepared from any of the aldehydes and polyhydric alcohols mentioned above may be used in place of the polyacetal of Example 1. Further, any of the isocyanates and polyamines and low molecular weight active hydrogen containing compounds used as modifiers may be used throughout the working examples for those included therein.

Although the invention has been described in considerable detail for the purpose of illustration, it is to be understood that variations may be made therein by those skilled in the art without departing from the spirit of the invention and the scope of the claims.

What is claimed is:

1. A process for the preparation of elastomeric polyurethane fibers which comprises reacting a polyacetal having at least two hydroxyl groups and a molecular weight of from about 500 to about 5000, a member selected from the group consisting of water, hydrazine and organic compounds containing active hydrogen atoms capable of reacting with —NCO groups and having a molecular weight less than about 400 and an excess of an organic polyisocyanate to form an —NCO terminated intermediate in a first step and spinning the said intermediate into an organic polyamine bath to form a fiber.

2. A process for the preparation of elastomeric polyurethane fibers which comprises reacting in an inert solvent a polyacetal having at least two hydroxyl groups and a molecular weight of from about 500 to about 5000, a member selected from the group consisting of water, hydrazine and organic compounds containing active hydrogen atoms capable of reacting with —NCO groups and having a molecular weight less than about 400 and an excess of an organic polyisocyanate to form an —NCO terminated intermediate in a first step and spinning the said intermediate into an organic polyamine bath to form a fiber.

3. A process for the preparation of elastomeric polyurethane fibers which comprises reacting a polyacetal having at least two hydroxyl groups and a molecular weight of from about 500 to about 5000 and a melting point less than 60° C., a member selected from the group consisting of water, hydrazine and organic compounds containing active hydrogen atoms capable of reacting with —NCO groups and having a molecular weight less than about 400 and an excess of an organic polyisocyanate to form an —NCO terminated intermediate in a first step and spinning the said intermediate into an organic polyamine bath to form a fiber.

4. A process for the preparation of elastomeric polyurethane fibers which comprises reacting a polyacetal having at least two hydroxyl groups and a molecular weight of from about 500 to about 5000, a member selected from the group consisting of hydrazine, water and organic compound containing active hydrogen atoms capable of reacting with —NCO groups and having a molecular weight less than 400 and an organic polyisocyanate in a quantity such that the —NCO to —OH ratio is from about 1.9:1 to about 3.5:1, said reaction being carried out at a temperature of from about 70° C. to about 130° C. in an inert solvent to obtain an —NCO terminated intermediate in solution and spinning said solution into a bath containing an organic polyamine to obtain a polyurethane fiber.

5. A process for the preparation of elastomeric polyurethane fibers which comprises reacting a polyacetal having at least two hydroxyl groups and a molecular weight of from about 500 to about 5000, a member selected from the group consisting of hydrazine, water and organic compounds containing active hydrogen atoms capable of reacting with —NCO groups and having a molecular weight less than 400, said group member being present in an amount equivalent to react with from about 0.1 percent to about 60 percent of the —NCO groups remaining after all the active hydrogen atoms of the polyacetal are reacted, and an organic polyisocyanate in a quantity such that the —NCO to —OH ratio is from about 1.9:1 to about 3.5:1, said reaction being carried out at a temperature of from about 70° C. to about 130° C. in an inert solvent to obtain an —NCO terminated intermediate in solution and spinning said solution into a bath containing an organic polyamine to obtain a polyurethane fiber.

References Cited in the file of this patent
UNITED STATES PATENTS

| | | |
|---|---|---|
| 2,850,467 | Livingood | Sept. 2, 1958 |
| 2,953,839 | Kohrn et al. | Sept. 27, 1960 |
| 3,036,020 | Britain | May 22, 1962 |
| 3,044,991 | Muller et al. | July 17, 1962 |